United States Patent [19]
Clark et al.

[11] Patent Number: 4,952,946
[45] Date of Patent: Aug. 28, 1990

[54] SCANNING BEAM POSITION DETECTING APPARATUS FOR USE IN ELECTRONIC PRINTER

[75] Inventors: Peter P. Clark, Acton; William T. Maloney, Sudbury; Philip R. Norris, North Reading; William T. Vetterling, Lexington, all of Mass.

[73] Assignee: Polaroid Corporation, Cambridge, Mass.

[21] Appl. No.: 259,963

[22] Filed: Oct. 19, 1988

[51] Int. Cl.$^5$ .................... G01D 15/14; G02B 26/08
[52] U.S. Cl. .................................... 346/108; 350/6.6; 250/231.13
[58] Field of Search ................ 346/108, 107 R, 76 L; 350/6.6, 3.66; 250/231 SE

[56] References Cited
U.S. PATENT DOCUMENTS

| | | | |
|---|---|---|---|
| 3,060,319 | 10/1962 | Greunke | 250/219 |
| 4,079,252 | 3/1978 | Brake | 250/237 |
| 4,178,064 | 12/1979 | Mrdjen | 350/6.6 |
| 4,420,760 | 12/1983 | Phillips | 346/108 |
| 4,518,998 | 5/1985 | Warner | 358/208 |
| 4,523,838 | 6/1985 | Yamada | 355/66 |
| 4,559,562 | 12/1985 | Kramer | 358/208 |
| 4,585,938 | 4/1986 | Neumann et al. | 250/235 |
| 4,600,837 | 7/1986 | DiStefano et al. | 250/235 |
| 4,616,132 | 10/1986 | Kessler | 250/236 |
| 4,701,006 | 10/1987 | Perlmutter | 350/3.6 |
| 4,725,723 | 2/1988 | Shimojima | 250/231 SE |

Primary Examiner—Mark J. Reinhart
Attorney, Agent, or Firm—Edward S. Roman; Leslie J. Payne

[57] ABSTRACT

There is disclosed a scanning beam position indicating arrangement which is employed in an electronic printer for accurately clocking a writing beam of the printer as a function of writing beam position. One embodiment of a scanning beam position indicator arrangement utilizes a Fresnel mirror device. Another embodiment utilizes a holographic encoding element. Still another embodiment utilizes a ellipsoidal mirror device. Another embodiment utilizes a holographic lens.

31 Claims, 10 Drawing Sheets

SCANNING BEAM POSITION DETECTING APPARATUS FOR USE IN ELECTRONIC PRINTER

BACKGROUND OF THE INVENTION

The present invention is directed generally to an optical scanning printer of the type employing a modulated beam of light which is scanned across image recording material, as the latter is moved transversely to the direction of scanning and, in particular, to an apparatus for controlling the modulation of the beam as a function of beam position.

A number of known electronic printing systems of the foregoing kind employing modulated light beams exist. For accurately placing a pixel of light on the image recording material, the light emitting source must be turned on at the exact moment that the scanning beam would be where the pixel is to be written.

Precision of beam movement from pixel spot to pixel spot is, of course, required for satisfactory results. Precision becomes critical when photographic quality images are to be printed. With photographic quality prints, however, each pixel size is very small, for example 0.127 mm in diameter. Such size is, of course, necessary for obtaining the desired resolution needed for photographic prints. In photographic quality situations, misplacement of a relatively small number of pixels or even a single scanning line can lead to undesirable prints.

Unfortunately, misplacement of pixels is rather difficult to avoid on a consistent basis especially given the numerous potential problems that exist in the mechanics and optics of known electronic printing systems.

Correct pixel placement in some known printing devices is achieved by using a reference or tracking beam travelling in synchronization with the writing beam for feedback control of the energization of the writing beam. The tracking beam is directed to an encoding device which then reflects modulated pulses of the tracking beam to a detector. The modulated tracking beam is representative of writing beam position. The pulses when detected by the detector control timing of the energization or modulation of the writing beam. Representative examples of such approaches are disclosed in U.S. Pat. Nos.: 4,523,093; 4,600,837 and 4,616,132.

However, when printing photographic quality images, each pixel spot is small as noted above. As a result, the response time of the encoding device to correct for pixel deviation for feedback control purposes must be correspondingly faster. For instance, if the writing beam is energized for a period of 17 microseconds, it is desirable to have a feedback response time within a microsecond time frame.

It is, therefore, critical to provide a system which can quickly and accurately respond to the position of a scanning writing beam in order to compensate for writing beam deviations in placing pixels on a recording medium, especially in situations wherein photographic quality images are to be printed.

SUMMARY OF THE INVENTION

In accordance with the principles of the present invention there is provided an improved apparatus for use in detecting error in the position of a scanning beam.

Provision is made for an electronic image printing apparatus for printing images on an image recording medium. Included in the apparatus is a housing assembly. Disposed in the housing assembly is means for mounting the image recording medium. Means for producing at least a writing beam in response to electronic signals corresponding to an image of a subject selected for printing is provided. A reference beam producing means is included. Provision is made for optically directing and for scanning the writing and reference beams in synchronism and displaced relation with respect to each other along a scanning path. Provision is made for encoding means extending in spaced parallel relation along the entire extent of the scanning path for encoding and reflecting the reference beam incident thereon into a plurality of pulses of reflected radiation which pulses are representative of the position of the writing beam along the scanning path. Detecting means are provided for detecting the reflected reference beam pulses to produce corresponding feedback control signals indicative of the writing beam position along the scanning path. Provision is made for means for effecting the displacement of said scanning path with respect to the image recording medium to provide a two dimensional image scan.

In one illustrated embodiment the encoding means is defined by a Fresnel mirror device positioned generally coextensively along the scanning path and immediately juxtaposed to an image plane on the image recording medium. The Fresnel mirror device directs the reflected reference beam pulses at least towards the detecting means.

In another illustrated embodiment, there is provided a holographic encoding element or device extending along the length of the scanning path. This device is arranged to intercept the scanning reference beam and is immediately juxtaposed to an image plane of the image recording medium. The holographic encoding device is effective for defining the plurality of reflected pulses by having alternating reflective and non-reflective areas and directing the reflected reference beam pulses at least towards the detecting means.

In another illustrated embodiment, the encoding arrangement includes an encoding element comprised of alternating reflective and non-reflective areas extending along the length of the scanning path and which defines the reflected pulses. Included in this encoding arrangement is a holographic lens which is generally coextensive with the encoding element. The lens is effective to direct the reflected pulses towards at least the detecting means.

In still another embodiment, the encoding arrangement utilizes an encoding element like that of the previous embodiment. However, it utilizes an ellipsoidal mirror device to direct the reflected pulses toward the detecting means.

The invention is also directed to writing beam position detecting apparatus for use in detecting the position of a writing beam in an electronic printer of the kind noted above.

Among the other objects of the invention are the provision of an electronic printer having an improved writing beam position detecting arrangement; the provision of such an arrangement which utilizes an encoding arrangement immediately adjacent the focal plane on image recording material in the printer so as to provide information relating to highly accurate writing beam positions; the provision of such an arrangement for a printer which facilitates quick and reliable responses to the positions of the writing beam; the provision of such an arrangement as described previously which is simple and inexpensive in construction; the provision of such an arrangement which utilizes a Fresnel mirror device for encoding purposes, and which is able to direct the reflected pulses to preselected areas; the provision of an arrangement as the last noted type which utilizes a holographic encoding device which directs the reflected pulses to preselected areas; the provision of such an arrangement which utilizes an encoding element immediately juxtaposed to an image plane on the image recording material and a holographic lens for directing reflected pulses towards preselected areas; the provision of an arrangement as noted above which utilizes an ellipsoidal mirror device for directing the reflected pulses towards a detector; the provision of an arrangement of the above noted types which utilize inexpensive yet highly accurate encoding devices.

The above and other objects and further scope of applicability of the present invention will become apparent with the following detailed description when read in conjunction with the accompanying drawings wherein like reference numerals indicate like structure throughout the several views.

DETAILED DESCRIPTION

Figure 4:
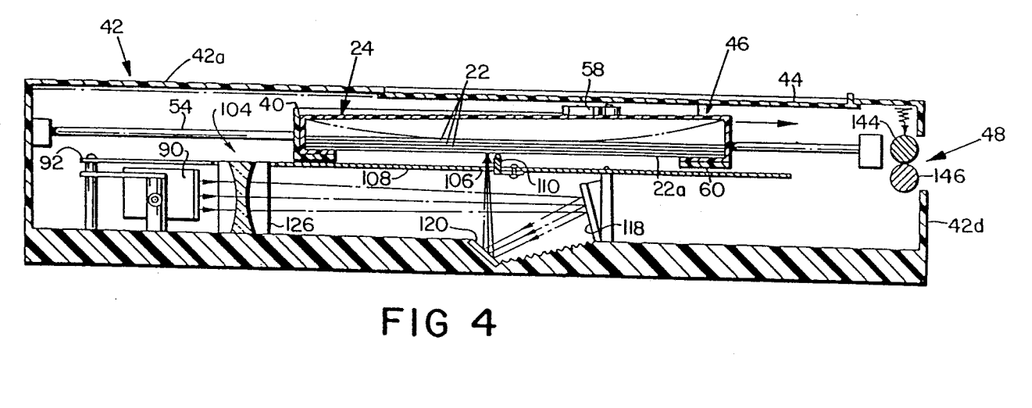
FIG. 4 is a different longitudinal cross-section view of the printer showing still another component more clearly.
Figure 5:
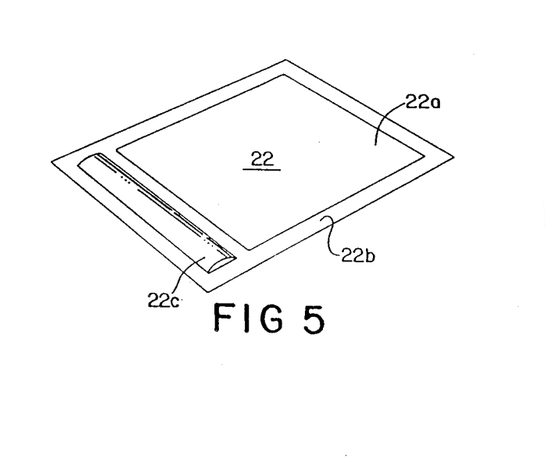
FIGS. 5 & 5a are perspective views showing in greater detail a film unit to be used and a film pack assembly respectively.

Reference is made to FIGS. 1-11 for showing preferred embodiment of an electronic image printing apparatus 20 of the present invention. The electronic image printing apparatus 20 is intended for use in generating and developing images on individual ones of a plurality of photosensitive film units 22 (FIG. 5). Each of the film units 22 is adapted to be processed following exposure by the printing apparatus 20 in a manner described more fully in commonly assigned and copending application Ser. No. 158,585, filed Feb. 22, 1988, entitled "Electronic Image Printing Apparatus" by Lawrence M. Douglas. Only those details of the printer necessary for describing this invention will be set forth. However, such a detailed description is, incorporated herein by reference for purposes of completion.

The film units 22 are of the self-developing type, such as the kind manufactured by Polaroid Corporation. Other kinds of image recording materials are contemplated for use. Whatever kinds are selected though, they would of course be sensitive to exposure by a suitable source of energy used for recording purposes. Typically, each of the film units 22 includes an image forming area 22a bordered by a frame 22b having a rupturable pod 22c of processing fluid disposed along a leading marginal edge thereof.

Figure 5A:
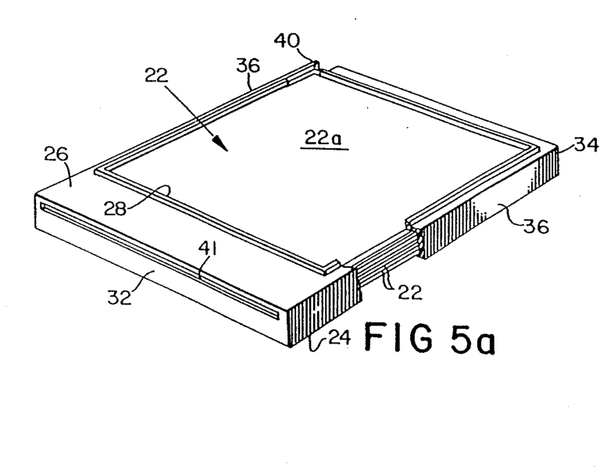

As is known, the pod 22c is ruptured when it is advanced to and between a pair of pressure applying spread rollers, which causes spreading of the processing fluid between positive and image receiving elements (not shown) of a film unit 22. This action serves to initiate a known diffusion transfer process, whereby latent images on each image forming area 22a are developed. The film units 22 are held in a stacked array in a film cassette or box 24 (FIG. 5a).

Figure 7:
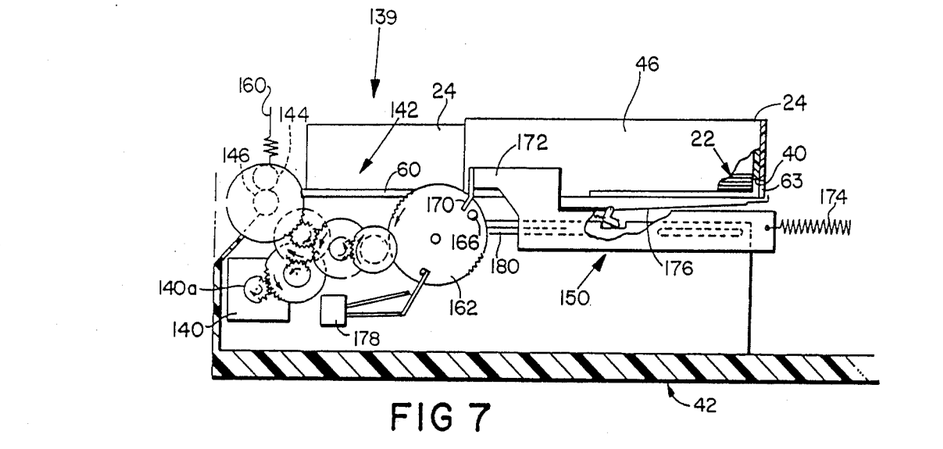
FIG. 7 is an enlarged and fragmented view illustrating certain components of the printer apparatus.

The film cassette 24 has a generally parallelpiped structure and is made of a suitable opaque material. The parallelpiped structure includes a wall 26 defining a light exposure aperture 28 which is in registry with the image forming area 22a of successive ones of the film units 22. The film cassette 24 includes a bottom wall 30 (FIG. 2), leading end wall assembly 32, rearward wall 34 and opposing side walls 36. A spring platen or pack spring (not shown) is arranged to provide a yieldable platform for the film units 22 so as to feed successive units to a focal plane defined by the aperture 28. It should be noted that in this embodiment, the film cassette 24 is arranged so that the aperture 28 faces downwardly. Accordingly, the image area 22a of each of the successive film units 22 to be exposed is facing downwardly relative to the electronic image printing apparatus 20. For ejecting each of the film units 22, the wall 26 of the film cassette 24 is formed with an elongated recess or cutout 40 (FIG. 7). The cutout 40 is constructed to allow a picking mechanism, to be described later, to push successive exposed film units 22 through an exit opening 41 formed in the leading end wall assembly 32.

Reference is now made back to FIGS. 1-4 for better showing a portable housing assembly 42 of the printer 20 which includes a parallelpiped structure having top wall 42a and front wall 42d. Formed in the top wall 42a is an opening which cooperates with a door 44 mounted for slidable movement between open and closed positions. Whenever the door 44 is open, it allows entry and removal of the film cassette 24. The film units 22 are intended to be ejected from the film cassette 24 and are advanced through the front discharge slot 48 in the front wall 42d. The front wall 42d can include several appropriate switches and indicators. In this embodiment, the front wall 42d has mounted thereon an on-off switch 50 which when actuated effects commencement of an image generating and recording cycle. Also, an indicator lamp 52 is mounted on the front wall 42d for purposes of indicating that the apparatus 20 is operating.

A film cassette carriage 46 (FIGS. 2-4) is mounted in the interior of the housing assembly 42 to move reciprocally along a predetermined axial path between an image printing start position and a film unit withdrawal position. The path is defined by a pair of spaced apart and parallel longitudinally extending guide rods 54. Laterally extending from each side of the film cassette carriage 46 is a pair of linear bearing assemblies 56, each pair of which is mounted on a respective guide rod 54 for supporting the film cassette carriage 46 for sliding movement. For releasably clamping the film cassette 24 in the film cassette carriage 46, there is provided a pair of clamping arms 58.

The film cassette carriage 46 has a ledge portion 60 defining an aperture 62 which is sized and shaped so that the entire image area 22a of successive ones of the film units 22 can be exposed. The film cassette carriage 46 is also formed with a pick slot only partially shown at 63 (FIG. 7) which allows picking of an exposed film unit 22 from the film cassette 24.

Provision is made for a compact and integral scanning driving mechanism or means 64 which is operable for simultaneously operating both fast and slow scanning movement. See FIGS. 2 and 6.

Figure 1:
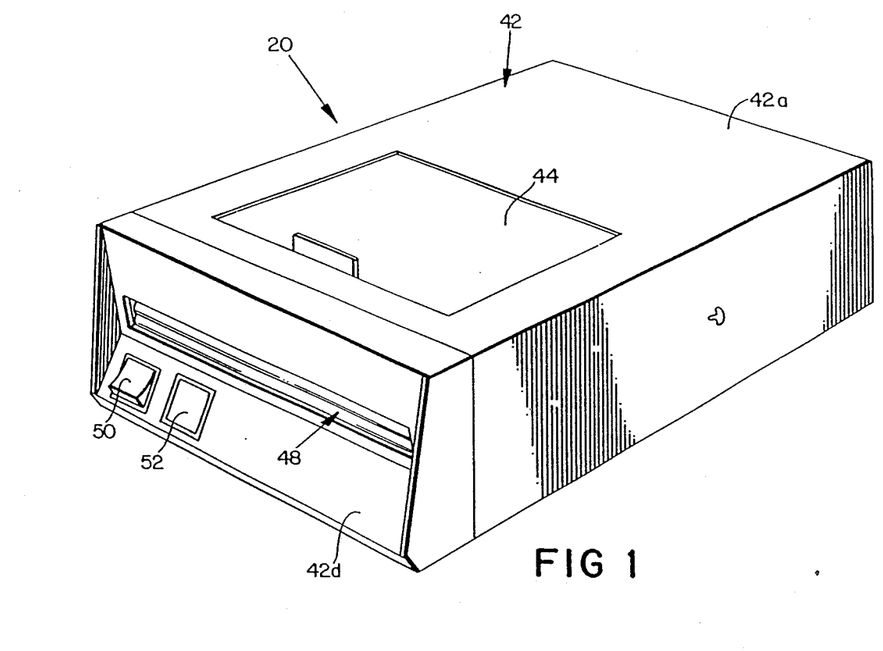
FIG. 1 is a perspective view of an electronic printer of the type which includes a beam position detecting device of the present invention.
Figure 2:
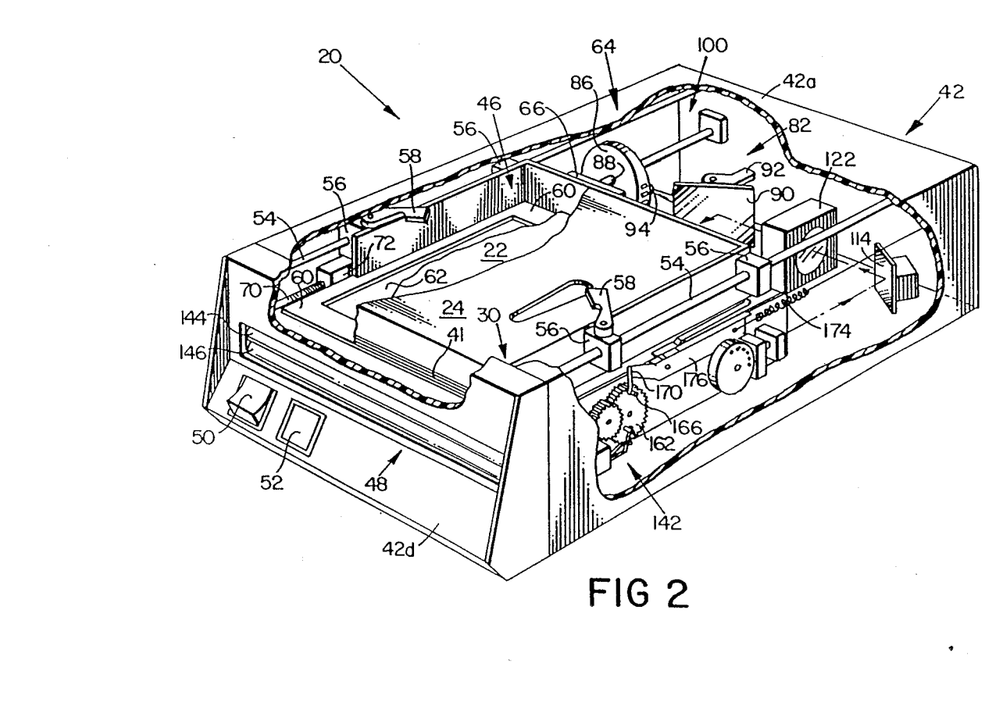
FIG. 2 is a view similar to FIG. 1 but with portions removed for purposes of illustrating several components of the printer.
Figure 3:
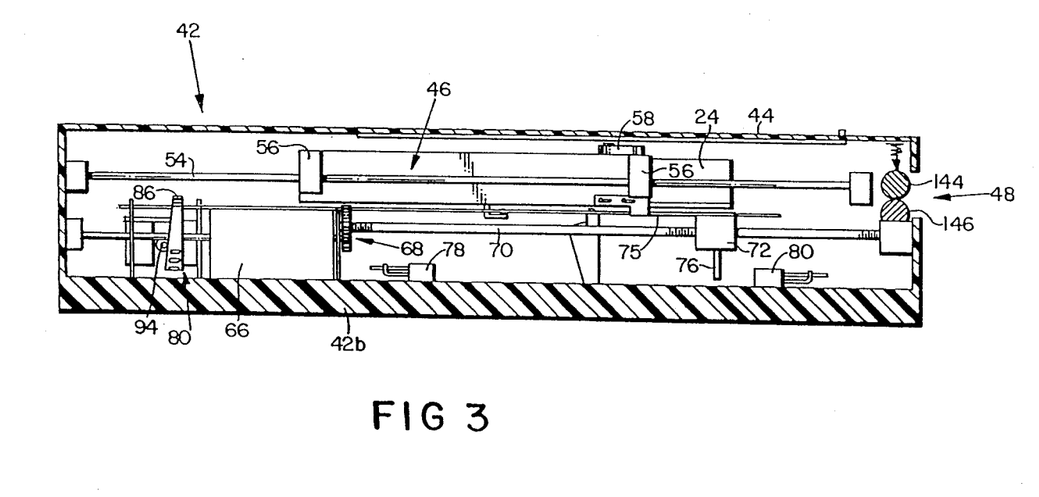
FIG. 3 is a longitudinal cross-sectional view of the printer showing several other components more clearly.
Figure 6:
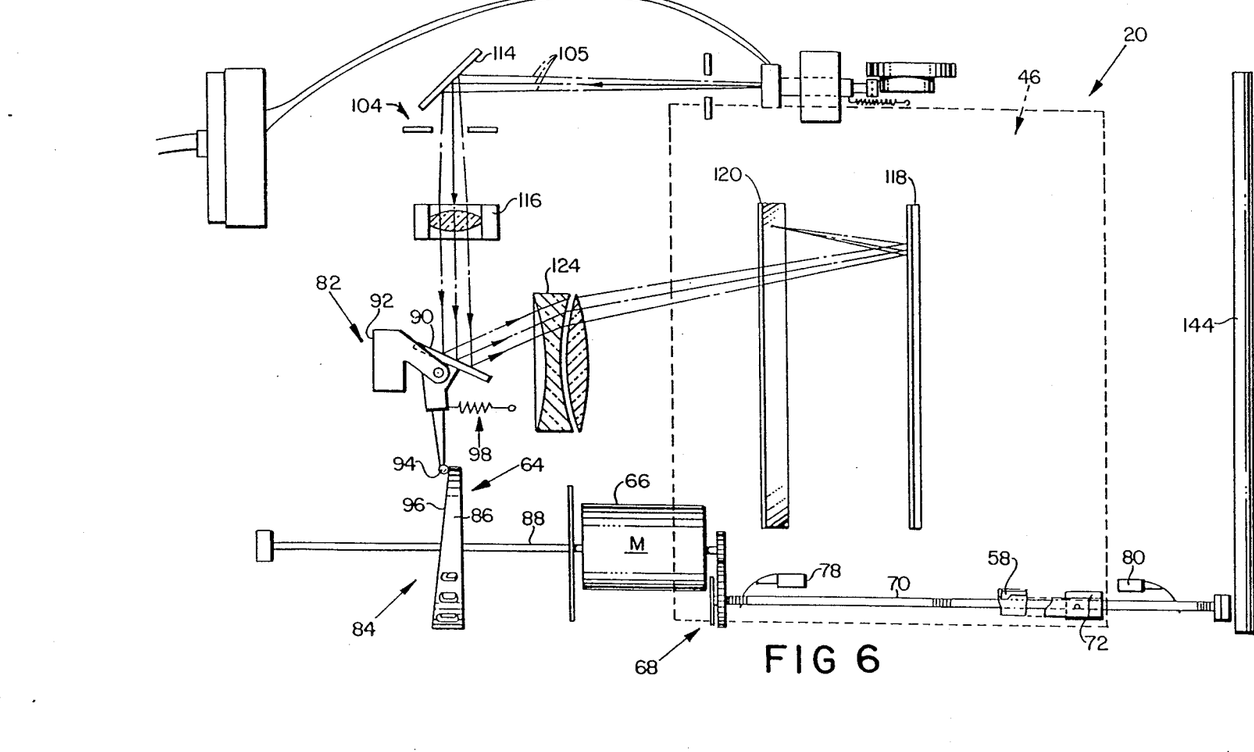
FIG. 6 is a diagrammatic view of certain components of the printer apparatus.

For effecting the slow scan movement, provision is made for an electric driving motor 66, a gear reduction mechanism 68 and a carriage advance lead screw 70 having threadedly coupled thereto a coupling nut 72 (FIGS. 2 & 6). The coupling nut 72 is connected to the film cassette carriage 46. The driving motor 66 starts and stops responsive to appropriate signals from the apparatus control circuit (not shown). The driving motor 66 is appropriately energized at the commencement of an image generating and recording cycle and is effective to bidirectionally drive the lead screw 70 through the gear reduction mechanism 68. Rotation of the lead screw 70 advances the cassette carriage 46 roughly less than 317.5 microns per revolution of the lead screw. Thus rotational movement of the motor's output shaft is converted to axial movement of the cassette carriage 46. This is the so-called slow scan movement of the film cassette carriage 46 and is generally transverse to the fast scan movement. The slow scan speed can, of course, be varied by varying the output speed of the driving motor 66. Selective actuation of the limit switches 78 and 80 results in ending the linear movement of the film cassette carriage 46 by effectively stopping operation of the driving motor 66.

Simultaneously with the slow scan movement, there is provided fast scanning movement. Fast scanning is considered movement of modulated light beams across the width of the image areas 22a of the film units 22. The combination of the slow and fast scanning movements provide for raster scan imaging of the image forming area 22a.

Reference is made to FIGS. 2-4 & 6 for showing structure which is operable for performing the fast scanning movement. Included is an oscillatable scanning mirror assembly 82. The scanning mirror assembly 82 is directly oscillated by a mirror driving mechanism 84.

The mechanism 84 includes a rotatable cam 86 directly connected to an output shaft 88 of the driving motor 66. The scanning mirror assembly 82 includes a generally rectangular mirror 90 mounted for oscillation about a vertical axis defined by an upstanding support 92. The scanning mirror 90 serves to deflect the bundles of light being emitted from a light source to be described. Essentially, the scanning mirror 90 scans the film plane with the modulated light beams.

A cam follower 94 is integral with the scanning mirror 90 and has one end biased against a camming surface 96 of the cam 86 by a biasing spring 98. The spring 98 is connected to and between the cam follower 94 and a post in the housing assembly 42. As the camming surface 96 rotates in response to rotation of the output shaft 88, the cam follower 94 will effect mirror oscillation. The cam profile establishes the position of the pixel spots on the film. Owing to this, variations of motor speed do not affect pixel spot placements.

The cam profile is selected to allow the scanning mirror 90 to print or expose along equal increments of the film plane with the light spots being representative of the electronic data and being delivered at a fixed frequency. This assumes the output shaft 88 rotates at a constant speed. The scanning mirror 90 returns to the initial or start scan position following rotation of the cam profile.

The encoder system 100 (FIGS. 9-11) of the present embodiment compensates for unacceptable pixel misplacement. It doesn't use the shaft encoder approach of the embodiment of the last noted application. Compensation is achieved by regulating the firing time of the light emitting diodes 102a-c (FIG. 9) in synchronism with the position of a reference beam on the print plane. As previously noted, it is important for the modulation of the writing beams to be timed so that they are at the desired pixel spots on the film which spots correspond to the image to be produced.

Reference is now made to FIGS. 4 and 6 for better illustrating the optical system 104. The optical system is a preobjective scanning type whereby the light emitted from the light emitting diodes 102a-c scans a predetermined flat path on the print plane so that the print spots are in focus along a scanning line. Thus, optical system 104 provides means for imaging the light bundles or writing beams 105 from the respective ones of the light emitting diodes 102a-c onto the image forming area 22a or print plane through an elongated scanning slot 106 (FIGS. 4 & 10) formed in a horizontally supported masking plate 108.

The masking plate 108 is supported in the housing assembly 42 beneath the moving cassette and immediately adjacent the image area 22a of the film unit 22 to be exposed. The masking plate 108 also serves to block stray light from striking undesired parts of the film. The scanning slot 106 is arranged to extend across the width of the image area being exposed. The scanning slot 106 allows formation of the exposure or scanning line. A resilient low-friction film flattener 110 interferes slightly with the film unit and is aligned adjacent the exposure line. The flattener 110 compensates for the fact that the film units 22 are inherently flexible and not entirely flat by providing a flat zone locally at the focal plane adjacent the slot 106.

Referring back to the optical system 104 it includes a lens group 116 which directs the writing beams 105 from a stationary mirror 114 to the scanning mirror 90. From the scanning mirror 90, the beams 105 are directed to a light converging lens group 124 which then directs them to strike a pair of suitably placed reflecting mirrors 118 and 120 to go through the scanning slot 106 onto the print or film plane.

The scanning mirror 90 is effectively the aperture stop of the optical system. Images of the scanning mirror 90 formed by the lens group 124 and any subsequent optical components in the optical path, for example the mirrors 118, 120 will be referred to as exit pupils.

In this embodiment, three light emitting diodes 102a–c are shown and are capable of generating color images. While the present embodiment discloses the use of light emitting diodes, other kinds of energy emitting sources, such as laser diodes, may be used. For laser diodes to be effectively utilized, of course, the image recording material must be sensitive to exposure by the lasers' spectral wavelengths.

Figure 9:
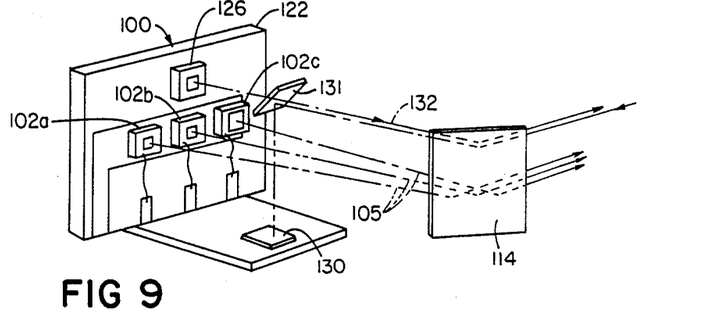
FIG. 9 is an enlarged perspective view illustrating other features of the noted one embodiment.

As shown in FIGS. 6 and 9, the light emitting diodes 102a–c are mounted on a linearly adjustable planar light emitting diode board assembly 122. The diode board 122 is positionable to a location which insures that each bundle or beam of light from respective ones of the light emitting diodes 102a–c is focused at the film or print plane. This embodiment also includes means for allowing focusing adjustment of the diodes on the diode board 122 as explained in the last noted application. The light emitting diodes 102a–c are arranged in spaced apart and generally horizontal relationship relative to the base of the housing assembly 42. The light emitting diodes 102a–c when energized, produce, respectively, red, green and blue spectral wavelengths. In this embodiment, the size of each pixel produced by the light emitting diodes 102 a,b is 0.157×0.1 mm. The size of the pixel spot produced by diode 102c is larger for reasons explained in the last noted application.

Referring back to the encoder system 100 (FIGS. 9-11), it essentially includes a reference beam emitter 126, an encoding means or device 128 and a photodetector assembly 130 utilizing a beam splitter 131. The reference beam emitter 126 may be an infrared light emitting diode which when energized generates a nonmodulated reference or tracking beam 132. Other spectral frequencies can be used for the reference beam 132.

The reference beam 132 is initially directed to the film plane by the noted optical system 104. The scanning mirror 90 deflects the reference beam 132 so that it is linearly swept or scanned in synchronism with the writing beams 105. The reference beam 132 is, of course, focused on the print plane along with the writing beams 105. Because the infrared reference beam emitter 126 is vertically displaced on the diode board 122, the reference beam 132 will travel through the beam splitter 131 in a parallel and displaced fashion with respect to the writing beams 105. The reference beam 132 impinges upon the encoding device 128.

Figure 8:
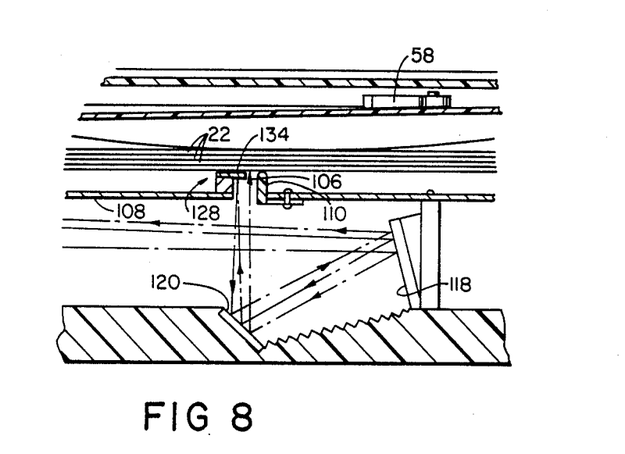
FIG. 8 is an enlarged and fragmented cross-sectional view of one embodiment of the present invention.
Figure 10:
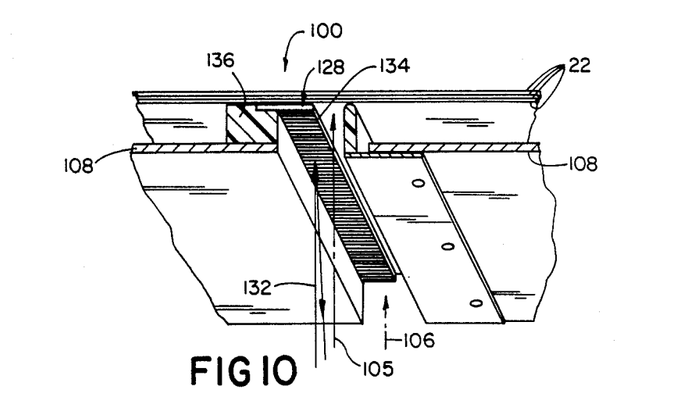
FIG. 10 is a partial cross-sectional and perspective view from beneath the components depicted.
Figure 11:
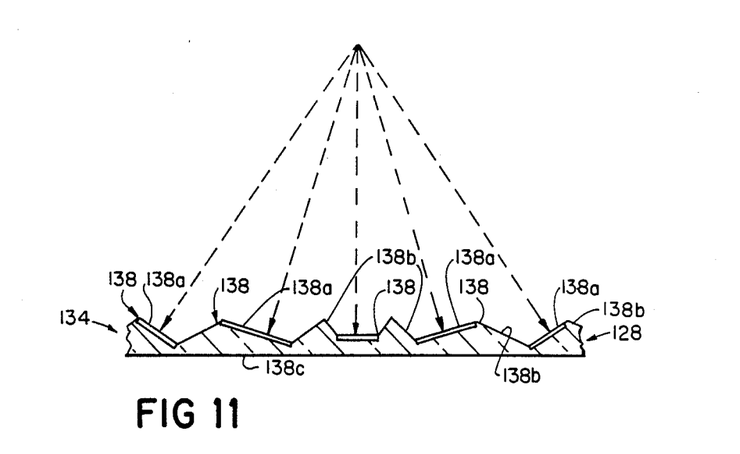
FIG. 11 is an enlarged and fragmented cross-sectional view of a Fresnel mirror device of the present invention.

Reference is now made to FIGS. 8, 10 and 11 for better illustrating the encoding device 128. In this embodiment the encoding device 128 is comprised of a linearly extending Fresnel mirror device 134. The Fresnel mirror 134 is mounted on a block 136 connected to the flexible masking plate 108 and very slightly flexes when contacted by the moving cassette. As mounted, a portion of the Fresnel mirror 134 is coextensive with the longitudinal extent of the scanning slot 106. The Fresnel mirror 134 as will be explained chops or interrupts the reference beam 132 for purposes of generating modulated retroreflective reference beam pulses and directs them back to the photodetector assembly 130.

In this regard, FIG. 11 shows an enlarged and fragmented cross-sectional view of the Fresnel mirror 134 illustrating facets 138, several of which have pitched and reflective surfaces 138a which are used for purposes of directing the reflected reference beam back through the optical system 104 to the photodetector assembly 130 through the beam splitter 131. The other surfaces 138b of the facets 138 do not reflect the beam back to the photodetector assembly 130. The Fresnel mirror device 134 has a planar surface 138c resting on the film plane. Although not shown, this invention contemplates that the surface with the facets can rest on the film plane and that suitable surfaces of the facets would have reflective surfaces designed to reflect the reference beam back to the photodetector assembly 130. Also, each reflective surface 138a is spaced from the others by a distance which is equal to about four pixels. The above-noted spacing ratio between reflected and non-reflected portions of the reference beam facilitates ready use of the electronic control system described in copending and commonly assigned application Ser. No. 207,287 filed June 15, 1988, by Martin A. Agulnek, which when it receives encoder ticks energizes four pixel spots for each detected pulse. Of course, other ratios besides a 4:1 ratio can be provided. The reflective surfaces 138a each reflect a sufficient amount of incident radiant energy back to the photodetector assembly 130. Dead space or dwells (i.e. where there is no discernible reflection return to the photodetector) are created by surfaces 138b. Accordingly, reflections and non-reflections are in an alternating relationship and affect interruptions of the reference beam 132 to produce modulated retroreflective pulses which are sensed to produce encoder ticks or clock control signals. Each encoder tick or feedback control signal is transmitted to a data clock (not shown) in the control circuit (not shown). Thereafter, the encoder tick responsive clock pulses are transmitted to a microcomputer (not shown) in the control circuit. Image data received by the microcomputer, from any well-known source, such as magnetic tape or disc is thereafter directed to circuitry (not shown) which modulates the intensity of the output of light emitting diodes 102a–c. Of course, the electronic image data may be enhanced. There are many advantages to having the Fresnel mirror 134 located immediately adjacent the focal plane along the scanning slot 106. One is that the feedback reference signals are more precise as to writing beam position.

The Fresnel mirror 134 can have facets at opposite ends which provide a series of reflections aimed at a photodetector (not shown) which would effectuate appropriate signals for signaling start and end of scanning for each scanning line. Besides facets, photodetectors (not shown) could be mounted in the scanning slot 106 to serve to identify start and end of scan based on the reference beam striking them. Alternatively, sensed dead space at ends of the Fresnel mirror 134 could serve to facilitate identification of start and end of scan.

Figure 12:
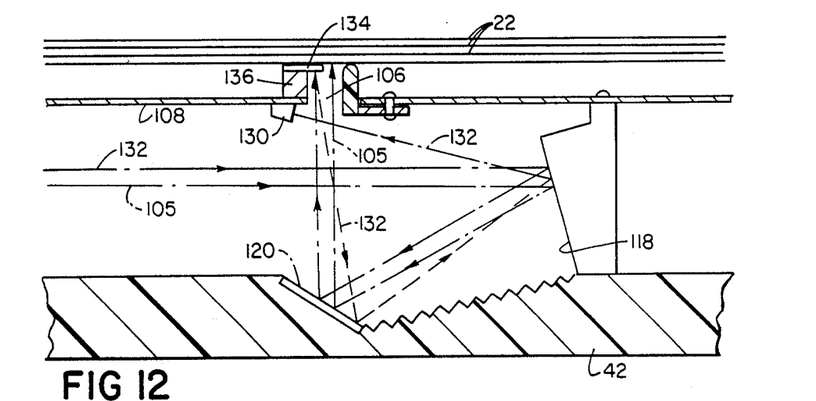
FIG. 12 is an enlarged and fragmented cross-sectional view of a Fresnel mirror device used for directing the reflected beams to a different photodetector location.

The Fresnel mirror device 134 has the capability of directing reflected light to a preselected fixed location in space, where a photodetector is located. Because the Fresnel mirror device 134 can direct light to preselected locations, the photodetector can be placed at a convenient location close to the encoding device itself. Thus, reflected light scattering and a corresponding lessening of signal strength of the retroreflected beam are diminished. This enhances signal strength. In this regard, as shown in FIG. 12, the photodetector 130' can be placed at a location to minimize optical loss of the reflected reference beam 132 through the optical system 104. In this case, the reflective facet surfaces direct the retroreflected beams by way of mirrors 118, 120 to the photodetector assembly 130' which is connected to and beneath the masking plate 108.

Reference is made back again to the details of the printer 20. In particular, reference is now being made to FIG. 7 for showing a processing mechanism 139 for processing each of the exposed film units 22 subsequent to an image printing cycle. Essentially, the processing mechanism 139 includes a motor 140, a gear train assembly generally indicated by reference numeral 142 for driving a pair of film processing rollers 144 and 146 and a film picking mechanism 150. The processing rollers 144 and 146 are supported in the housing assembly 42 and are spaced apart by a predetermined gap which gap facilitates formation of a desired processing fluid thickness used for processing the film units. A pair of springs 160, one of which is diagrammatically shown, is provided, each one of which yieldably biases an end portion of the topmost processing roller 144. The processing rollers 144 and 146 provide progressive pressure on the film units 22 as the latter travel therepast.

Now referring to the gear assembly 142, it includes a sequencing gear 162 which is driven by the motor 140. The film picking mechanism 150 is supported for generally reciprocal movement adjacent the film cassette 24 as described more fully in the last noted application. The film picking mechanism 150 is driven through the gear train assembly 142 in response to rotation of the motor output shaft 140a. The sequencing gear 162 has a projection or lug 166 which is arranged to engage a tab 170 at the forward end of a pick slide 172. This engagement causes sliding movement of the pick slide 172 towards the forward position of the housing assembly 42. It will be appreciated that the pick slide 172 is suitably mounted and moves against the urging of a spring 174 which has its other end attached to the housing assembly 42. The spring 174 returns the pick slide 172 to its normal at rest position when the gear 162 no longer engages the tab 170. However, upon engagement of the tab 170 by the gear 162, the pick slide 172 is advanced for a limited stroke which is effective to cause a pick arm 176 which is connected to the slide 172, to engage the film unit 22. The pick arm 176 travels through the slot 63 in the film cassette carriage 46 and cutout 40 in the film cassette 24. Continued rotation of the sequencing gear 162 will, of course, result in the pick arm 176 advancing the film unit 22 through the exit slot 41, whereby the leading edge of the exited film unit is brought into engagement with the nip of the processing rollers 144, 146.

Continued rotation of the sequencing gear 162 causes the lug 166 to rotate, so then it will engage arms of a switch 178. The switch 178 is effective through the control circuit to stop operation of the motor 140. Engagement of the switch 178 occurs after the film unit 22 has been advanced from both the film cassette 24 and the housing assembly 42 by the processing rollers 144, 146. Accordingly, a film unit 22 can be removed by an operator.

Reference is now made to other embodiments of the present invention as they relate to the use of holographic systems for use in encoding schemes. As noted, it is important to have a relatively short response time for position feedback control signals in order to correct for deviations in desired print spot scanning on the print plane. Since the light emitting diodes 102a–c are contemplated to be energized for periods in the order of, for example, 17 microseconds, then the response time to be effective for feedback purposes should be in the order of about 1 microsecond. Towards this end, small area (small capacitance) photodetectors are contemplated for use. However, it is equally important that the signal strength of the returning reference beams should be kept strong. Therefore, it is desired to increase the amount of light striking them. One approach is to place the photodetector relatively close to the encoding scheme to enhance return signal strength.

Figure 13:
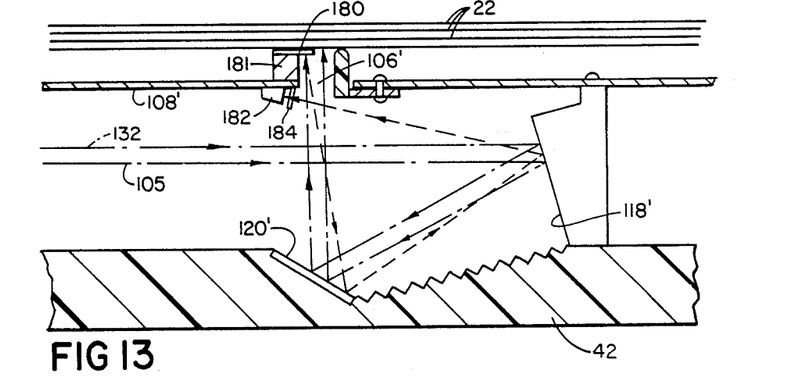
FIG. 13 is a view similar to FIG. 12 illustrating another embodiment of the present invention.

In the embodiment of FIG. 13 a holographic encoding device or element 180 replaces the Fresnel mirror device of the previous embodiment. An advantage of using the holographic encoding device 180 is the fact that it too is easily and inexpensively replicated by known techniques.

The holographic encoding device 180 is an elongated and flexible member which is preferably placed in engagement with the print plane. Accuracy of the system is therefore enhanced greatly.

As shown in FIG. 13, the holographic encoding device 180 is mounted on a block 181 on the flexible masking plate 108' immediately adjacent and generally coextensive with the scanning slot 106'. The holographic encoding device 180 includes the functions of an encoding device and holographic lens which has the capability of forming a real image of the exit pupil at which a photodetector may be placed. Because of a hologram's ability to direct light to preselected locations, the photodetector 182 can be placed at a convenient location which is close to the encoding device 180. Because the reflected light is redirected towards the photodetector, the signal strength is enhanced.

It is seen that the photodetector 182 is affixed to the bottom of the masking plate 108' and adjacent the scanning slot 106' so as to receive the modulated retroreflected reference beams from the mirrors 118', 120'. As a consequence, the amplitude of the reflected reference beams is not diminished greatly. It will be appreciated that in this embodiment, the photodetector 182 can be placed at a variety of locations so long as the photodetector is of course, positioned relative to the mirrors to receive the reflected reference beam pulses. The plate 108' will flex downwardly very slightly when the device is contacted by the cassette moving therepast.

Because the holographic encoding device 180 is positioned at the image plane of the reference beam emitter, the lensing function of the holographic encoding device cannot alter the diverging angle of the reflected light from the encoding device. This beam will accordingly diverge as it propagates away from the holographic encoding device towards the photodetector 182. Thus, amplitudes of the reflected pulses tend to thereby lessen. Towards the end of improving signal strength of the light striking the photodetector 182, a short-focal-length lens 184 is used. The lens 184 is positioned in front of the photodetector 182 to capture and converge the light onto the photodetector surface. The lens 184 accordingly adjusts magnification of the image of the pupil plane. Thus, signal amplitude is improved.

The holographic encoding device 180 is created so as to include the functions of an optical grating and optical lensing as discussed above. The grating function has the effect of a series of alternating nonreflective and reflective areas. Each reflective area is about the width of a pixel, for example, about 5 mils. In this embodiment since there are about 200 scanning lines to the inch, each pixel spot would be roughly 5 mils in diameter. The non-reflective areas can be in the order of slightly in excess of 20 mils so as to thereby create a space where there is no reflection. The 4:1 ratio is used because it is consistent with the control system mentioned above. Other variations can be used to define the spacing of the non-reflective and reflective areas; respectively.

The holographic encoding device 180 can be formed by the interference of two coherent beams of light by well-known techniques. Alternatively, it can be formed by replicating through contact printing using known techniques. The holographic encoding device 180 of this embodiment is a phase-type hologram. It is made by using a pair of mutually coherent light sources and exposing a photopolymeric film material, such as Polaroid Corporation's commercially available DMP 128. Stated briefly, the holographic encoding material has one surface exposed by one beam which converges toward the detector position and from the opposite side by a second beam, coherent with the first, which diverges from the effective source of the scanning rays, which is the exit pupil, and passes through an optical grating described above before striking the recording material. The optical grating should be in close proximity to the material.

Although the above approach has been described for purposes of making the phase-type hologram, it will be appreciated that the present invention envisions other approaches. For instance, the holographic encoding element may be generated by computer by methods well known to those skilled in the art.

Figure 14:
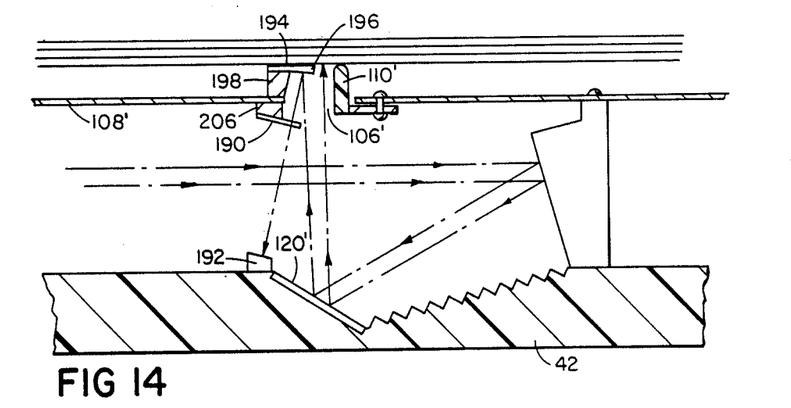
FIG. 14 is an enlarged and fragmented cross-sectional view illustrating still another embodiment of the present invention.

In the embodiment shown in FIG. 14 the holographic lensing function and holographic encoding function are separated and implemented in two separate devices. A holographic lens device 190 is used to direct modulated and retroreflected reference light as before to the photodetector 192 as well as to perform the function of causing light to converge towards the center of the photodetector. This is possible inasmuch as the holographic lenses of the lens device 190 are not located in the image plane of the reference beam emitter as was the case in the previous embodiment. The photodetector 192 can be placed relatively close to an encoding mirror device 196 and in a convenient location which does not obstruct the operation of any printer components. As illustrated, the photodetector 192 is mounted on the assembly 42 beneath the scanning slot 106' and adjacent the mirror 120'. Its positioning does not obstruct passage of the writing and reference beams coming from the scanning mirror. The holographic lens 190 is not the holographic encoding grating of the previous embodiment insofar as it does not provide any encoding functions. In this embodiment encoding is achieved by virtue of the encoding mirror device 196 having thereon a reference grating comprised of a plurality of alternating non-reflective and reflective stripes (not shown), each having dimensions which can be on the order of those noted above for reflective and non-reflective areas in the last embodiment. The encoding mirror 196 is mounted on a mounting bracket 198 on flexible plate 108' and is in immediate juxtaposed relationship to the print plane and is arranged to extend generally coextensively with the scanning slot 106'. The encoding device mirror 196 is placed in a canted position relative to the scanning slot 106'. The canting is done so as to direct the reflected reference beams to the holographic lens 190 which in turn directs the reference beams to the photodetector 192. While the encoding mirror device 196 is canted on one surface, another surface 194 has a smooth and planar surface at the print plane upon which the film unit slides while traveling in the slow scan direction.

The holographic lens 190 is formed in a manner so that it directs all reflected beams incident along its length toward the photodetector 192. This enhances the signal strength of the photodetector's response.

This holographic lens 190 integrally includes a plurality of lens areas (not shown) formed in a generally linear array. The lens 190 is generally coextensive with the scanning slot 106' and is mounted to the underside of the mounting bracket 206 on the masking plate 108'. Formation of a holographic lens 190 of the type mentioned above is not discussed in detail. The fabrication of such a lens is within the competence of one having ordinary skill in the holographic arts. The previously noted holographic embodiment can use suitable start of scan and end of scan detecting approaches similar to that used for the Fresnel mirror device 134.

Figure 15:
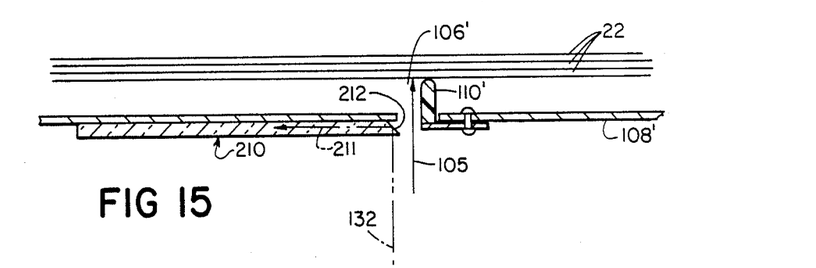
FIG. 15 is an enlarged cross-sectional view of still another embodiment of the present invention.
Figure 16:
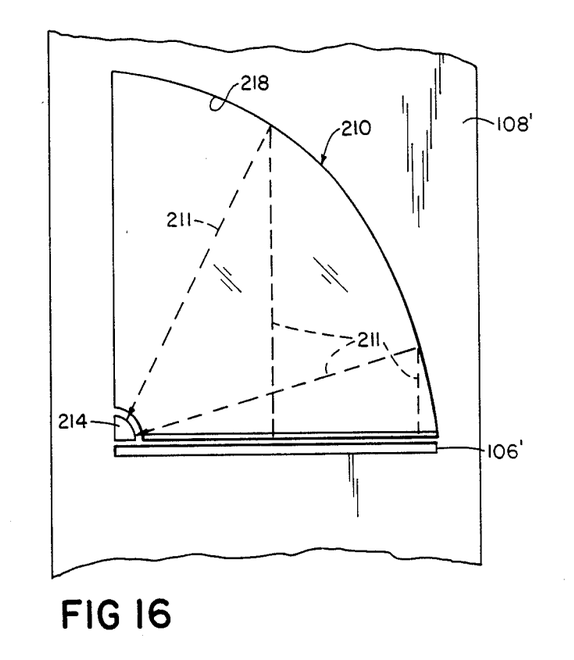

Reference is made to FIGS. 15 & 16 for illustrating other embodiments of the present invention. In this embodiment use is made of a ellipsoidal mirror device 210 instead of a holographic element. As shown, the ellipsoidal device 210 is mounted to the underside of the masking plate 108' and is generally coextensive with the longitudinal extent of the scanning slot 106'. Essentially, the ellipsoidal mirror device 210 intercepts the reference beam 132 and directs encoded reflected pulses 211 of light from a reflecting encoding surface 212, like the type described above to a small area photodetector 214, by reasons of reflection and lightpiping. The small area photodetector 214 is mounted on the underside of the masking plate 108' adjacent the ellipsoidal mirror device 210. The photodetector 214 is located at one of the two foci of an ellipsoidal mirror surface 218. The exit pupil of the printer optical system is at the other focus. The ellipsoidal surface 218 is such that the reflected light pulses 211 from the encoding surface 212 travel approximately the same distance to the photodetector 214. This enhances uniformity of reflected signal strength. Such a characteristic is highly desirable in an encoding scheme.

Towards the end of directing reflected light pulses 211 to the photodetector 214, the reflective encoding surface 212 has a plurality of alternating reflective and non-reflective areas having the same general size and distribution as the kind noted above. The reflected reference surface is at an appropriate angle relative to the reference beam 132. In this embodiment, the emitter 126 would be displaced rearwardly on the diode board relative to the other diodes 102a–c so that the reference beam can focus on the encoding surface 212.

Figure 15A:
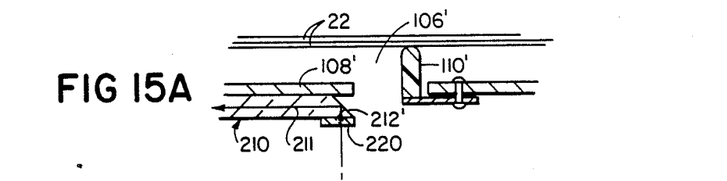
FIG. 15A is an enlarged and fragmented view of still another embodiment of the invention; and, FIG. 16 is a planar view of the operative components of the embodiment illustrated in FIG. 15.

In the embodiment shown in FIG. 15A, the reflective encoding surface 212 of the previous embodiment is replaced by a transparent encoding member 220 having a plurality of alternating transmissive and non-transmissive areas with the size and spacing arrangement noted earlier with the other encoding devices. The encoding member 220 will create the encoded pulses which will be reflected by total internal reflection after striking inclined surface 212' and directed towards the ellipsoidal mirror surface. The inclined surface 212' is at an angle which may be in a range for directing, by total internal reflection, all the encoded light pulses 211 to the photodetector 214. If the above angle is outside the range for total internal reflection, the surface 212' can be coated with reflective material. The ellipsoidal mirror device 210 is comprised of a solid block of transparent glass or plastic, such as an optical quality acrylic material.

The ellipsoidal mirror device 210 is simple and economical to manufacture and install, yet is capable of providing the requisite signal strength for facilitating the rapid response time for feedback control functions. Of course, operation of the foregoing embodiment is believed obvious from the foregoing description.

This invention contemplates that a separate reflecting ellipsoidal mirror surface 218 could be provided separate from a reflecting surface 212, the latter would direct the reflected pulses 211 towards the ellipsoidal mirror surface 218.

Since certain changes may be made in the above noted embodiments without departing from the scope of the invention herein involved, it is intended that all matter contained in the description or shown in the accompanying drawings shall be interpreted as illustrative and not in a limiting sense.

What is claimed is:

1. An electronic image printing apparatus for printing images on an image recording medium, said apparatus comprising:
   a housing assembly;
   means disposed in said housing assembly for mounting the image recording medium;
   means for producing at least one writing beam in response to electronic signals corresponding to an image of a subject selected for printing;
   means for producing a reference beam;
   means for optically directing and scanning the writing and reference beams in synchronism and spaced relation with respect to each other along at least one predetermined scanning path;
   means extending in spaced parallel relation along the entire extent of the scanning path for encoding and reflecting the reference beam incident thereon into a plurality of pulses of reflected radiation which pulses are representative of the position of the writing beam along the scanning path;
   means for detecting the reflected reference beam pulses to produce corresponding feedback control signals indicative of the writing beam position along the scanning path, and
   means for effecting the displacement of said scanning path with respect to the image recording medium to provide a two dimensional image scan.

2. An electronic image printing apparatus for printing images on an image recording medium, said apparatus comprising:
   a housing assembly;
   means disposed in said housing assembly for mounting the image recording medium;
   means operable for producing at least a writing beam in response to electronic signals corresponding to an image of a subject selected for printing;
   means operable for producing a reference beam;
   means for optically directing and for scanning the writing and reference beams in synchronism and displaced relation with respect to each other along at least a scanning path;
   encoding means for reflecting the reference beams incident thereon into a plurality of pulses of reflected light which pulses are representative of the position of the writing beam along the scanning path, said encoding means including a Fresnel mirror device positioned generally coextensively along the scanning path and immediately juxtaposed to an image plane on the image recording medium, said Fresnel mirror device reflecting the reference beam pulses;
   means for detecting a plurality of reflected reference beam pulses to produce corresponding feedback control signals; and,
   means for effecting the displacement of said scanning path with respect to the image recording medium to provide a two-dimensional image scan.

3. The apparatus of claim 2 wherein:
   said Fresnel mirror device has a plurality of facets formed along one surface thereof and generally coextensive with the scanning path and reflective surfaces on selected facets, said facets including said reflective surfaces modulating the reference beam incident thereon to produce the reflected pulses which pulses are representative of the writing beam position.

4. The apparatus of claim 2 wherein:
   said detecting means is located immediately adjacent said reference beam producing means so that said reflected surfaces of said facets direct the reflected pulses thereto.

5. The apparatus of claim 2 wherein:
   said detecting means is at a location immediately adjacent said Fresnel mirror device which location is at an image of an exit pupil of said optical means.

6. The apparatus of claim 2 wherein:
   said means for effecting displacement includes means for driving the image recording medium in a printing direction.

7. An electronic image printing apparatus for printing images on an image recording medium, said apparatus comprising:
   a housing assembly;
   means disposed in said housing assembly for mounting the image recording medium;
   means operable for providing at least a writing beam in response to electronic signals corresponding to an image of a subject selected for printing;
   means operable for producing a reference beam;
   means for optically directing and for scanning the writing and reference beams in synchronism and displaced relation with respect to each other along at least a scanning path;
   encoding means for reflecting the reference beam incident thereon into plurality of pulses of reflected light which pulses are representative of the position of the writing and reference beam along the scanning path;
   said encoding means including a holographic encoding device extending generally coextensively with the scanning path and arranged to intercept the scanning reference beam and is immediately juxtaposed to an image plane on the image recording medium, said holographic encoding device is effective for defining the plurality of reflected pulses by having alternating reflective and non-reflective areas and directing the reference beam pulses at least towards said detecting means;
   means for detecting a plurality of reflected reference beam pulses to produce corresponding feedback control signals; and,
   means for effecting displacement of said scanning path with respect to the image recording medium to provide a two dimensional image scan.

8. The apparatus of claim 7 wherein:
said holographic encoding device is of the phase type and is generally planar in configuration, said holographic encoding device being in engagement with the image recording medium at the image plane.

9. The apparatus of claim 7 wherein:
said detecting means is located immediately adjacent said holographic encoding device which location is at an image of an exit pupil of said optical means.

10. The apparatus of claim 7 wherein:
a lens device is positioned adjacent to said detecting means so as to change the magnification of the image of the pupil plane and cause convergence of the reflected pulses travelling from said holographic encoding device to said detecting means.

11. The apparatus of claim 2 wherein:
said means for effecting displacement includes means for driving the image recording medium in a printing direction.

12. An electronic image printing apparatus for printing images on an image recording medium, said apparatus comprising:
a housing assembly;
means disposed in said housing assembly for mounting the recording medium;
means operable for providing at least a writing beam in response to electronic signals corresponding to an image of a subject selected for printing;
means for producing a reference beam;
means for optically directing and for scanning the writing and reference beams in synchronism and displaced relation with respect to each other along at least a scanning path;
encoding means for reflecting the reference beam incident thereon into a plurality of pulses of reflected light which pulses of reflected light are directed to at least said detecting means, the pulses are representative of the position of the writing beam along the scanning path;
said encoding means including an encoding element comprised of alternating reflective and non-reflective areas extending along the scanning path, said encoding element being immediately juxtaposed to the image recording medium along the scanning path at the image plane; said encoding means further including a holographic lens which is generally coextensive with the scanning path and said encoding element, said lens arranged generally parallel and spaced from said encoding element; said holographic lens converges and directs the reflected light pulses from said encoding element towards at least said detecting means;
means for detecting a plurality of reflected reference beam pulses to produce corresponding feedback control signals; and,
means for effecting displacement of said scanning path with respect to the image recording medium to provide a two-dimensional image scan.

13. An electronic image printing apparatus for printing images on an image recording medium, said apparatus comprising:
a housing assembly;
means disposed in said housing assembly for mounting the recording medium;
means operable for providing at least a writing beam in response to electronic signals corresponding to an image of a subject selected for printing;
means for producing a reference beam;
means for optically directing and for scanning the writing and reference beams in synchronism and displaced relation with respect to each other along at least a scanning path;
encoding means including an encoding device for reflecting the reference beam incident thereon into a plurality of pulses of reflected light which pulses are directed to at least a common area and are representative of the position of the writing beam along the scanning path; and,
ellipsoidal means extending along the scanning path for reflecting the pulses from said encoding device to said detecting means, said ellipsoidal means includes at least one surface which intercepts the transmitted pulses and directs them by reflection towards a reflecting surface, said reflecting surface having an ellipsoidal configuration which is shaped and dimensioned to insure that light reflected therefrom is directed to a common point at which is located said detecting means;
means for detecting a plurality of reflected reference beam pulses to produce corresponding feedback control signals; and,
means for effecting displacement of said scanning path with respect to the image recording medium to provide a two-dimensional image scan.

14. The apparatus of claim 13 wherein:
said ellipsoidal means is a solid transparent block and said encoding device is attached to said block, said block directs the pulses by total internal reflection and lightpiping;
said encoding device having a plurality of alternating transmissive and non-transmissive areas extending along the scanning path and arranged to transmit the reference beam incident thereon into a plurality of the pulses of light which pulses are representative of the position of the writing beam along the scanning path.

15. The apparatus of claim 14 wherein:
said means for effecting displacement includes means for driving the image recording medium in a printing direction.

16. An electronic image printing apparatus for printing images on an image recording medium, said apparatus comprising:
a housing assembly;
means disposed in said housing assembly for mounting the recording medium;
means operable for providing at least a writing beam in response to electronic signals corresponding to an image of a subject selected for printing;
means for producing a reference beam;
means for optically directing and for scanning the writing and reference beams in synchronism and displaced relation with respect to each other along at least a scanning path;
encoding means for reflecting the reference beam incident thereon into a plurality of pulses of reflected light which pulses are directed to at least a common area and are representative of the position of the writing beam along the scanning path;
means for detecting a plurality of reflected reference beam pulses to produce corresponding feedback control signals;
said encoding means including an encoding device having a plurality of alternating reflective and non-reflective areas extending along the scanning path and arranged to reflect the reference beam incident thereon into a plurality of pulses of reflected light which pulses are representative of writing beam position along the scanning path; and ellipsoidal means extending along the scanning path for reflecting the reflected pulses from said encoding device to said detecting means, said ellipsoidal means includes a reflecting surface having an ellipsoidal configuration which is shaped and dimensioned to insure that light reflected therefrom is directed to a common point at which is located said detecting means; and means for effecting displacement of said scanning path with respect to the image recording medium to provide a two-dimensional image scan.

17. The apparatus of claim 16 wherein:
said ellipsoidal means is a solid transparent block and said encoding device is integral with said block, said device and said block direct the pulses by reflection and lightpiping.

18. The apparatus of claim 16 wherein:
said means for effecting displacement includes means for driving the image recording medium in a printing direction.

19. Apparatus for detecting positions of a scanning beam in an electronic printer having means operable for producing a scanning beam; means for mounting and driving an image recording medium in at least a printing direction; and means for optically directing and scanning the scanning beam along a scanning path on the image recording medium, said apparatus comprising:
means operable for producing a reference beam;
said directing and scanning means scanning the reference beam in synchronism and displaced from the scanning beam along the scanning path which is generally transverse to the printing direction;
means for detecting a plurality of reflected pulses of the reference beam for producing corresponding feedback control signals; and,
encoding means for reflecting the reference beam incident thereon into a plurality of pulses of reflected light which pulses are directed to at least said detecting means and are representative of the position of the scanning beam along the scanning path; said encoding means being positioned generally coextensively along the scanning path and being immediately juxtaposed to an image plane on the image recording medium, said encoding means including Fresnel mirror device which directs at least some of the reference beam pulses to said detecting means.

20. The apparatus of claim 19 wherein:
said Fresnel mirror device has a plurality of facets formed along one surface thereof and generally coextensive with the scanning path and reflective surfaces on selected facets, said facets including said reflecting surfaces for modulating the reference beam incident thereon to produce the reflected pulses, which pulses are representative of writing beam positions.

21. The apparatus of claim 19 wherein:
said detecting means is located immediately adjacent said Fresnel mirror device which location is at an image of an exit pupil of said optical means.

22. The apparatus of claim 19 wherein:
said detecting means is located immediately adjacent said reference beam producing means.

23. Apparatus for detecting positions of a writing beam in an electronic printer having means operable for producing a scanning beam; means for mounting and driving an image recording medium in at least a printing direction; and means for optically directing and scanning the scanning beam along a scanning path on the image recording medium, said apparatus comprising:
means operable for producing a reference beam;
said directing and scanning means scanning the reference beam in synchronism and displaced from the scanning beam along the scanning path which is generally transverse to the printing direction;
means for detecting a plurality of reflected pulses of the reference beam for producing corresponding feedback control signals;
encoding means for reflecting the reference beam incident thereon into a plurality of pulses of reflected light which pulses are directed to at least said detecting means and are representative of the position of the scanning beam along the scanning path; said encoding means including a holographic encoding device extending generally coextensively with the scanning path and being arranged to intercept the scanning reference beam and is immediately juxtaposed to an image plane on the image recording medium; said holographic encoding device is effective for producing said plurality of reflected pulses by defining alternating reflective and non-reflective areas and directing the reference beam pulses at least towards said detecting means.

24. The apparatus of claim 23 wherein:
said holographic encoding device is of the phase type and is generally planar in configuration, said holographic encoding material being in engagement with the image recording medium at the image plane.

25. The apparatus of claim 23 wherein:
said detecting means is located immediately adjacent said holographic encoding device which location is at an image of an exit pupil of said optical means.

26. The apparatus of claim 25 wherein:
a lens device is positioned adjacent to said detecting means so as to change the magnification of the reflected pulses and cause convergence of the reflected pulses from said holographic encoding device.

27. Apparatus for detecting positions of a writing beam in an electronic apparatus having means operable for producing a scanning beam; means for mounting and driving an image recording medium in at least a printing direction; and means for optically scanning the scanning beam along a scanning path on the image recording medium, said apparatus comprising:
means operable for producing a reference beam;
said scanning means scanning the reference beam in synchronism and displaced from the scanning beam along the scanning path which is generally transverse to the printing direction;
means for detecting a plurality of reflected pulses of the reference beam for producing corresponding feedback control signals;
encoding means for reflecting the reference beam incident thereon and into a plurality of pulses of reflected light which pulses of reflected light are directed to at least a common area and are representative of the positions of the scanning beam along the scanning path; said encoding means including an encoding element comprised of alternating reflective and non-reflective areas extending along the scanning path, said encoding element immediately juxtaposed to the image recording medium along the scanning path at the image plane; said encoding means further including a holographic lens which is generally coextensive with the scanning path and said encoding element; said lens arranged generally parallel to and spaced from said encoding element; said holographic lens converges and directs the reflected light pulses form said encoding element towards at least said detecting means.

28. Apparatus for detecting positions of a scanning beam in an electronic apparatus having means operable for producing a scanning beam; means for mounting and driving an image recording medium in at least a printing direction; and means for optically scanning the scanning beam along a scanning path on the image recording medium, said apparatus comprising:

means operable for producing a reference beam;
said scanning means scanning the reference beam in synchronism and displaced from the scanning beam along the scanning path which is generally transverse to the printing direction;
means for detecting a plurality of reflected pulses of the reference beam for producing corresponding feedback control signals;
encoding means for reflecting the reference beam incident thereon into a plurality of pulses of reflected light which pulses are directed to at least a common area and are representative of the positions of the scanning beam along the scanning path;
said encoding means including an encoding device having a plurality of alternating reflective and non-reflective areas extending along the scanning path and arranged to reflect the reference beam incident thereon into a plurality of pulses of reflected light at least towards said detecting means, the pulses being representative of scanning beam position, and ellipsoidal means extending along the scanning path for reflecting the reflected pulses from said encoding device to said detecting means said ellipsoidal means includes at least one surface which allows passage of the reference beam to said encoding device and which intercepts the reflected pulses and directs them by reflection towards a reflecting surface, said reflecting surface having an ellipsoidal configuration which is shaped and dimensioned to insure that all light reflected therefrom is directed to a common point at which is located said detecting means.

29. The apparatus of claim 28 wherein:
said ellipsoidal means is a solid transparent block and said encoding device is integral with said block, said device and said block direct the pulses by reflection and lightpiping 30. Apparatus for detecting positions of a scanning beam in an electronic apparatus having means operable for producing a scanning beam; means for mounting and driving an image recording medium in at least a printing direction; and means for optically scanning the scanning beam along a scanning path on the image recording medium, said apparatus comprising:

means operable for producing a reference beam;
said scanning means scanning the reference beam in synchronism and displaced from the scanning beam along the scanning path which is generally transverse to the printing direction;
means for detecting a plurality of reflected pulses of the reference beam for producing corresponding feedback control signals;
encoding means for reflecting the reference beam incident thereon into a plurality of pulses of reflected light which pulses are directed to at least a common area and are representative of the positions of the scanning beam along the scanning path; and,
ellipsoidal means extending along the scanning path for reflecting the pulses from said encoding device to said detecting means, said ellipsoidal means includes a reflecting surface having a elliptical configuration which is shaped and dimensioned to insure that light reflected therefrom is directed to a common point at which is located said detecting means.

31. The apparatus of claim 30 wherein:
said ellipsoidal means is a solid transparent block and said encoding device is attached thereto, said block directs the pulses by total internal reflection and lightpiping and,
said encoding device having a plurality of alternating transmissive and non-transmissive areas extending along the scanning path and arranged to transmit the reference beam incident thereon into a plurality of the pulses of light which pulses are representative of the position of the writing beam along the scanning path.

* * * * *